United States Patent [19]

Pracchia et al.

[11] Patent Number: 5,206,456
[45] Date of Patent: Apr. 27, 1993

[54] ORDNANCE THERMAL BATTERY

[75] Inventors: Louis Pracchia; Ronald F. Vetter; Darwin Rosenlof, all of Ridgecrest, Calif.

[73] Assignee: The United States of America as represented by the Secretary of the Navy, Washington, D.C.

[21] Appl. No.: 608,940

[22] Filed: Nov. 5, 1990

Related U.S. Application Data

[62] Division of Ser. No. 401,200, Aug. 24, 1989, Pat. No. 5,006,429.

[51] Int. Cl.$^5$ .......................... F42C 11/00; F42B 39/20
[52] U.S. Cl. ...................................... 102/207; 102/481
[58] Field of Search ................................. 102/207, 481

[56] References Cited

U.S. PATENT DOCUMENTS

| | | | |
|---|---|---|---|
| 3,946,675 | 3/1976 | Stalfors | 102/207 |
| 4,013,818 | 3/1977 | Askew et al. | 429/112 |
| 4,119,038 | 10/1978 | Allen et al. | 102/207 |
| 4,189,529 | 2/1980 | Birt et al. | 429/103 |
| 4,585,713 | 4/1986 | Pathe et al. | 429/112 |

Primary Examiner—Charles T. Jordan
Attorney, Agent, or Firm—Harvey A. Gilbert; Melvin J. Sliwka; John L. Forrest, Jr.

[57] ABSTRACT

A thermal battery activated by external heat comprising an anode, e.g. composed of a lithium-aluminum alloy, a cathode, e.g. composed of iron disulfide, and an electrolyte, e.g. a lithium chloride-potassium chloride eutectic, the electrolyte being inactive at ambient temperature but being activated by melting at a predetermined temperature when exposed to external heating. The battery can be used as a sensor or to ignite pyrotechnic and power electronic devices, in a system for reducing the hazard of ordnance exposed to detrimental heating. A particular application is the use of the battery to activate a squib to function in conjunction with one or more other components, to vent an ordnance case, preventing its explosion in a fire.

12 Claims, 2 Drawing Sheets

ORDNANCE THERMAL BATTERY

The invention described herein may be manufactured and used by or for the Government of the United States of America for governmental purposes without the payment of any royalties thereon or therefor.

This is a divisional of copending application: Ser. No. 07/401,200 filed on Aug. 24, 1989, now U.S. Pat. No. 5,006,429.

BACKGROUND OF THE INVENTION

This invention relates to a new and improved thermal battery, and is particularly concerned with a thermal battery which is activated by external heating such as a fuel fire.

Thermally activated electrochemical cells are well known. Standard ordnance thermal batteries are activated by igniting an electric match, squib, or percussion primer inside the battery which initiates combustion of heat generating material. Heat from combustion is retained inside the battery by thermal insulation. This heat melts the electrolyte and activates the battery.

Previous methods of reducing hazard from ordnance exposed to detrimental heating include pyrotechnic sensors that react chemically to provide heat and/or flame. Such sensors are intrinsically less reliable than sensors which provide an electrical signal or electrical energy.

Power generating devices utilizing a source of heat for activation are disclosed, for example, in U.S. Pat. Nos. 4,700,009 to Iden, 3,946,675 to Stalfors, 4,338,560 to Lemley, and 3,425,872 to Levy.

One object of the present invention is the provision of a thermal battery activated by heat from an external source.

Another object is to provide a thermal battery which operates without an internal initiating mechanism or heat generating materials and which may not utilize thermal insulation.

A still further object is the provision of an improved efficient thermal battery of the above type, constructed of readily available components, and particularly adapted to reduce hazards from ordnance such as missiles and rockets exposed to detrimental heating.

SUMMARY OF THE INVENTION

Broadly, the invention provides a thermal battery adapted to be actuated only by external heating, and comprises an anode, a cathode and an electrolyte positioned between the anode and the cathode, the electrolyte being inactive at ambient temperatures but being activated at a predetermined temperature by external heating.

The externally heated thermal battery (EHTB) of the present invention requires no special materials and uses the electrolytes, anode, and cathode materials of standard thermal batteries. However, the (EHTB) hereof is unique in that it operates without the presence of any internal initiating mechanism or heat generating materials, and does not require thermal insulation. Heat from any external source, such as a fuel fire or rocket motor, conductive, convective or radiant heat, engine exhaust, is necessary to melt the electrolyte and make the battery operational. Output from the battery can be used to ignite pyrotechnic devices and provides power to operate many power electronic devices. The (EHTB) of the invention has been successfully tested in a method of reducing the hazard of ordnance exposed to detrimental heating, as described in greater detail hereinafter. One particular application is to electrically activate a squib to vent an ordnance device, preventing its explosion in a fire.

The EHTB of the present invention is lighter and smaller than conventional thermal batteries because it has no internal heat generating material, thermal insulation, or initiating mechanism. As a result, the EHTB is also useful as a compact and lightweight source of power near a source of stable high temperatures. In particular, the EHTB is useful as a space-saving and lightweight source of electrical power during flight for some missile guidance and control systems, by taking advantage of waste heat from the propulsion source.

BRIEF DESCRIPTION OF THE DRAWINGS

The invention will be more readily understood from the detailed description below taken in conjunction with the accompanying drawings wherein.

DETAILED DESCRIPTION OF THE INVENTION

The externally heated thermal battery of the invention comprises at least one cell which contains as essential components an anode, a cathode and an electrolyte disposed between the anode and cathode. Various types of anodes, cathodes and electrolytes can be employed.

A preferred anode is composed of lithium-aluminum alloy. Other anode compositions include other lithium alloys, such as lithium-silicon alloy and lithium-boron alloy. Calcium and magnesium can also be employed.

A preferred cathode is composed of iron disulfide. Other cathode compositions which can be employed include calcium chromate and silver chromate.

A preferred electrolyte is composed of lithium chloride-potassium chloride eutectic. Other electrolyte compositions which can be employed include, for example, a mixture of 31.8% lithium nitrate and 58.4% sodium nitrite containing some (9.8%) lithium chloride. Thus, various combinations of salt-type mixtures can be used which can melt in the proper preselected melting range. The lithium chloride-potassium chloride eutectic melts at 666° F. While the above mixture of lithium nitrate and sodium nitrite containing lithium chloride melts at 265° F. These two respective electrolyte compositions are for different applications. An EHTB containing the latter electrolyte composition which melts at lower temperatures can function as a sensor for an oven-type slow cookoff environment. Such EHTB containing low temperature melting electrolyte can be used to prevent rocket motors, bombs and the like from reacting violently when exposed indirectly to fires or other heat sources. The above EHTB containing the higher temperature melting lithium chloride-potassium chloride eutectic electrolyte can function as a sensor in a fast cookoff environment where the device or ordnance to be protected is located directly in a fire.

Figure 1:
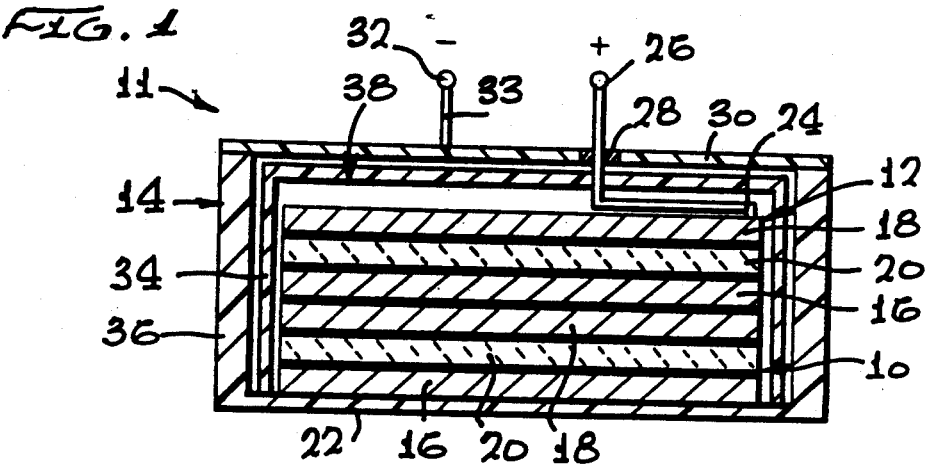
FIG. 1 is an elevational cross section of a two-cell EHTB design of the invention.
Figure 1A:
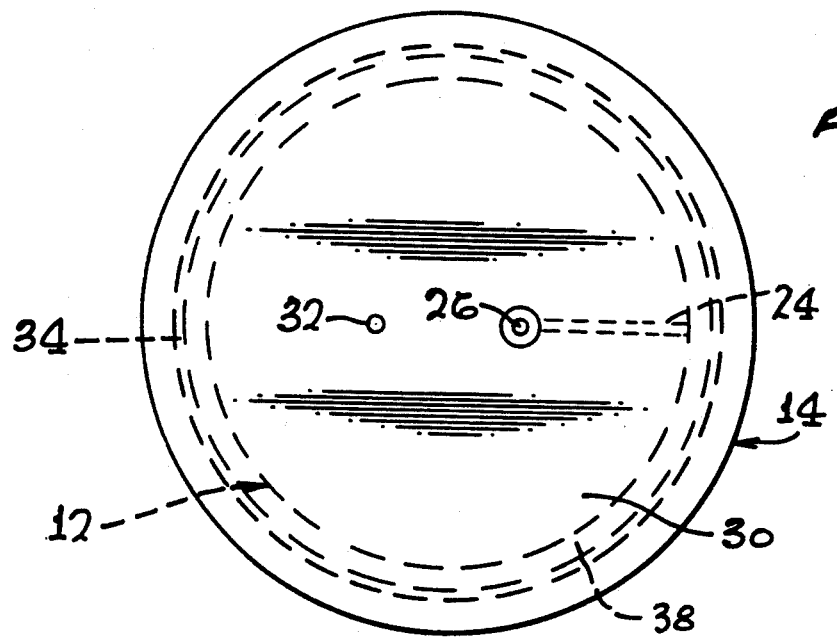
FIG. 1a is a plan view of the battery of FIG. 1.

A preferred type of two-cell EHTB is shown in FIGS. 1 and 1a of the drawing. The battery 11 is composed of two like cells 10 and 12 stacked within a battery case 14. Each of the cells 10 and 12 is composed of an anode 16, cathode 18 and electrolyte 20. The anode 16 is composed of a lithium-aluminum alloy, the cathode 18 is composed of iron disulfide and the electrolyte 20 is a lithium chloride-potassium chloride eutectic. The cells 10 and 12 are stacked with the bottom anode 16 of the lower cell 10 in intimate contact with the case bottom 22. The cells 10 and 12 are connected in series, with an electrical lead 24 connecting the cathode 18 of the upper cell 12 to a positive terminal 26, through electrical insulation 38, and a glass-to-metal seal 28 in the top 30 of the battery case 14, and an electrical lead 33 connecting the top of the battery case to a negative terminal 32.

It is noted that the battery 11 is constructed with a negative case ground by internally placing the anode 16 in intimate contact with the case bottom 22, so that the negative terminal terminates in the top 30 of the battery case 14. Thus, the battery connections are a series arrangement from the bottom of the battery case 14 (negative) to the top of the battery cell 10, 12) stack (positive). Electrical insulation, indicated at 34 is mounted along the inner wall 36 of the battery case 14, and extends at 38 over the top of the stacked cells. Electrical insulation 34 and 38 can be, for example, mica. The battery case 14, is hermetically sealed to prevent reaction of the battery components with the atmosphere, but does not have any thermal insulation. This battery design is useful for a fast cookoff environment where rapid activation of the battery is necessary.

If desired, the cells 10 and 12 can be connected in parallel. The use of series connected cells or parallel connected cells depends on what type of power is required for the device to which power is supplied.

For a slow cookoff environment or an application of the EHTB where the heating environment temperature rise is much more gradual, or where the EHTB will be discharged for extended periods of time at elevated temperatures, the cells may be insulated from the case wall by sufficient thermal insulation, and positioned so as to allow more even heating to all of the cells. However, thermal insulation is optional and may not be required on any EHTB of the invention.

As previously noted, the electrolyte inside the cell can be tailored to melt and activate the battery at a desired temperature which will be determined by the particular application. Output from the battery can be used to ignite pyrotechnic devices and power many electronic devices. A thermal switch may be included in the battery or battery circuit to allow pulse currents necessary to fire igniters.

The EHTB has been tested and employed in a method of reducing the hazard of ordnance exposed to detrimental heating. Specifically, the EHTB is to be mounted in close proximity to the rocket motor or other ordnance. Some applications may allow mounting the EHTB directly on the outside of the rocket motor case, while others may provide an internal mount where heat transfer is available to heat and activate the EHTB. In one embodiment in a fuel fire situation, the battery will heat up and become operational, thus providing power to ignite a squib or detonator. This in turn triggers a mechanism such as a shaped charge or a thermite reaction to open a hole in the side of the rocket motor case and allow the propellant to burn off with little internal pressure increase and no explosion.

In the method of using the EHTB of the invention as a sensor of temperature changes, the battery has the advantage of a selectable temperature of activation by tailoring the electrolyte composition, additional use of thermal/mechanical switches and circuits, or modifying the configuration, housing and number of battery cells. The battery also has the advantage of providing varying levels of power so that it may be used as either a signal or as an actuator.

The EHTB is also capable of being tested, as opposed to a standard thermal battery which is a one-shot device where inspection consists of selecting a sample from each production lot for testing. EHTB testing can be performed by heating, partially discharging to determine battery integrity and capability, and then cooling down each battery. The battery may be recharged while in the operational (heated) condition to return the battery to a full state of charge.

In the EHTB of the invention, a wide range of electrolyte compositions, anodes, cathodes, number of battery cells, configurations and housings, circuits and switches can be used.

Figure 2:
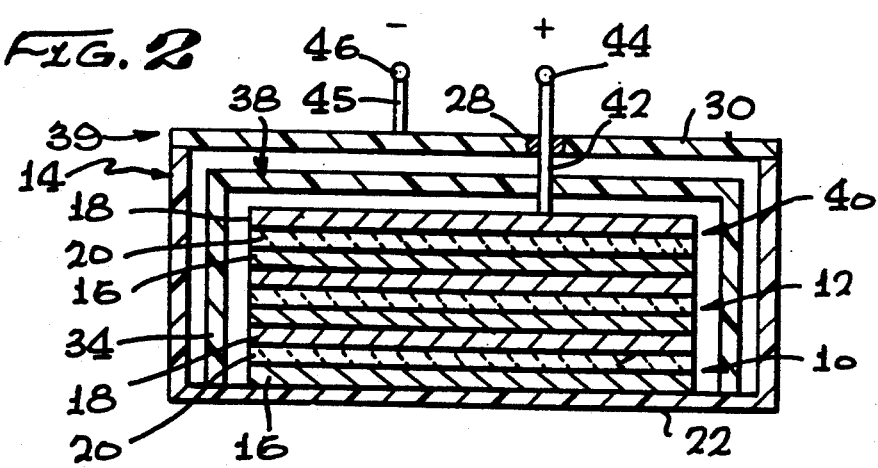
FIG. 2 is an elevational cross section of a three-cell battery (EHTB) according to the invention.

FIG. 2 illustrates another preferred type of three-cell EHTB of a construction similar to that of FIGS. 1 and 1a. Thus, the battery 39 of FIG. 2 is composed of three cells including cells 10 and 12 and a third cell 40 stacked from bottom to top within the battery case 14. The third cell 40 has an anode 16, a cathode 18 and an electrolyte 20 of the same chemical composition as the anode, cathode and electrolyte 16, 18 and 20 of the cells 10 and 12 noted above, and illustrated in FIGS. 1 and 1a. The cells are connected in series, with an electrical lead 42 connecting the cathode 18 of the upper cell 40 to a positive terminal 44, through 44, through electrical insulation 38 across the top of the battery and the glass to metal seal 28 in the top 30 of the battery, and an electrical lead 45 connecting the top cell 40 to a negative terminal 46, again noting that the battery is constructed with a negative case ground, as in the EHTB of FIG. 1. This three-cell battery otherwise has the same structural components as the EHTB of FIGS. 1 and 1a, and identified by the same numerals as in FIGS. 1 and 1a. The battery case of FIG. 2 is also hermetically sealed and can be used in a fast cookoff environment.

Figure 3:
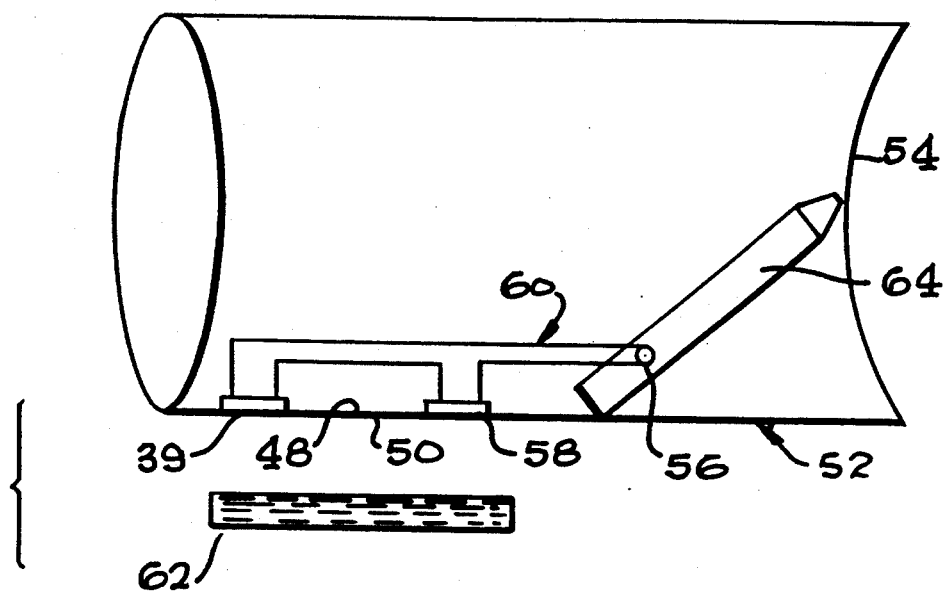
FIG. 3 illustrates an arrangement wherein the EHTB of FIG. 2 is mounted on the inside wall of a missile skin, and connected to components to vent the rocket motor case and ignite the propellant for safe burn off when the battery is activated by an external heat source.

A first fast cookoff test was carried out using the 3-cell EHTB 39 shown in FIG. 2 in an arrangement illustrated in FIG. 3. This EHTB had ⅜ inch diameter cells, and total battery dimensions were: 0.0875 inch in diameter by 0.425 inch in height, including terminal.

As shown in FIG. 3, the EHTB 39 was mounted on the inside wall 48 of the skin 50 of a missile 52, just forward of the solid rocket motor, indicated at 54. The EHTB was electrically connected to a BBU-32/B squibb 56 manufactured by Special Devices, Inc. of Newhall, Calif., through a zinc alloy thermal switch 58 also mounted on the inside wall of the missile skin in close proximity to the battery, via an electrical circuit indicated at 60. The rocket motor was suspended about 3 feet above a pool of JP-5 fuel 62.

The objective of the test was to ignite the squib 56 by means of electrical power from the EHTB upon closure of the thermal switch 58. The thermal switch 58 operates by the alloy thereof melting from the same source of heat which activates the battery 39, and providing the conductive path for the electrical power. The thermal switch activates at a higher temperature, e.g. about 790° F., than the battery, so that the battery will already be activated and be ready to supply power to the squib on the closure of the thermal switch. The squib 56 is in the nature of an igniter or detonator which upon activation closure of the thermal switch sends a flash of a flame which then ignites a small rocket motor type of cutting torch, indicated at 64. The cutting torch 64 vents the rocket motor case and ignites the propellant for safe burn-off.

The fuel fire was slow in developing and did not engulf the rocket motor for 35 to 40 seconds. EHTB voltage was monitored and was at optimum operational condition of about 5 volts at approximately 100 seconds. The thermal switch functioned at about 122 seconds. The EHTB then ignited the squib and the squib fired the cutting torch. The cutting torch did not function as desired, and the rocket motor ruptured at about 226 seconds. However, the test was successful for the EHTB in combination with the thermal switch for ignition of the squib. The EHTB functioned as desired, with a margin of safety between EHTB function and motor rupture of about 2.

Figure 4:
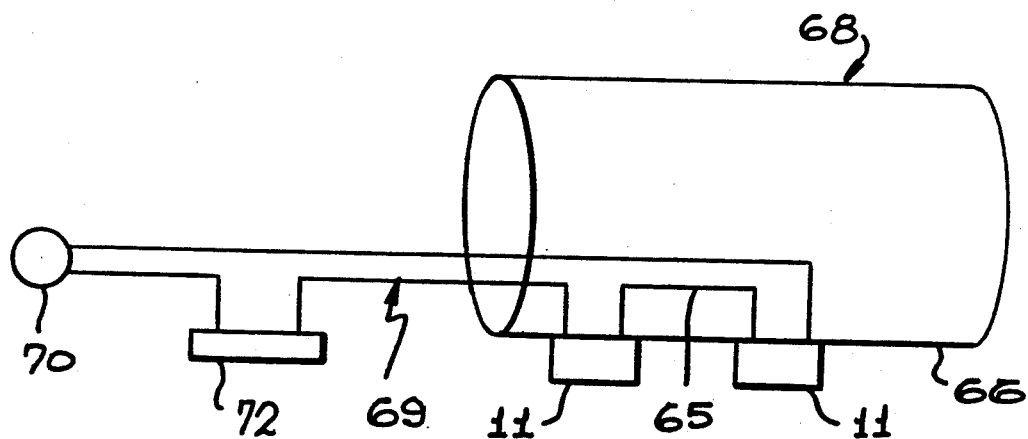
FIG. 4 illustrates an arrangement wherein a pair of EHTB's of the type of FIGS. 1 and 1a are mounted on the outside of a rocket motor skin, and connected to components to be activated upon actuation of the EHTB's by an external heat source, for ordnance safety.

As illustrated in FIG. 4, another test was performed using a pair of externally heated stacked 2-cell batteries of the type shown in 11 in FIGS. 1 and 1a, attached in a series arrangement at 65 and mounted on the external skin 66 of a rocket motor case 68, and electrically connected in series at 69 to a BBU-32/B squib 70 via a relay 72. The battery was held about 4 inches above a propane burner 74 during the test. Upon activation of a switch, the gas was turned on at the burner 74 and the flame started up as expected. The flame temperature of the burner was measured at between 2010° and 2050° F. during the test.

A GO switch (not shown) was connected to the relay 72 such that the relay would close upon manual actuation of the switch. The GO switch was in a remote safe location so that the test operator could throw the switch, thus closing the relay 72 and connecting the batteries to the squib 70. The GO switch and relay performed the function of the thermal switch 58 in FIG. 3 in this test. The GO switch was thrown when the batteries 11 on rocket skin 66 were at an optimum internal operating temperature, that is, about 1,000° F. and had a series voltage of about 7.0 volts. The batteries fired the squib with no apparent problem.

The FIG. 4 arrangement was in the nature of a proof-of-concept test. Thus, while two EHTB's were used in the test, a single EHTB would be sufficient if large enough and capable of meeting the requirements. In addition, the GO switch and relay of FIG. 4 can be replaced with a thermal switch, as at 58 in FIG. 3.

From the foregoing, it is seen that the invention provides an efficient thermal battery which operates when its electrolyte melts as result of heating of the battery by an external source, without any internal initiating mechanism or heat generating materials for activation, and which can be combined with means using the electrical output of the battery to ignite pyrotechnic and many electronic devices. The invention is particularly useful as a sensor in a system or device to reduce hazards from ordnance exposed to fuel fire or other detrimental heating.

Since various further changes and modifications can be made in the invention without departing from the spirit of the invention, the invention is not to be taken as limited except by the scope of the appended claims.

What is claimed is:

1. In combination, a thermal battery adapted to an ordnance device and to be activated only by externally heating said ordnance device which comprises at least one cell having
   an anode,
   a cathode, and
   an electrolyte positioned between said anode and said cathode, said electrolyte being inactive at ambient temperature but being activated by melting at a predetermined temperature by external heating and
   a means using the electrical output of the battery activated by externally heating said ordnance device, to ignite pyrotechnic or power electronic devices.

2. The combination of claim 1, said means including an igniter and a thermal switch, said battery being electrically connected to said igniter through said switch, said thermal switch being operable at a temperature higher than the temperature of activation of said battery, to actuate said igniter.

3. The combination of claim 2, said battery being mounted in close proximity to ordnance to be protected from fire, means associated with said ordnance and triggered by said igniter to protect said ordnance from detrimental heating by said heat source.

4. The combination of claim 3, said ordnance being a rocket motor, said battery being mounted on the rocket motor case, said last mentioned means being a mechanism activated by operation of said igniter to open a hole in the rocket motor case to allow propellant therein to burn off with minimal internal pressure increase and no explosion.

5. The combination of claim 4, said last mentioned means being a rocket motor type of cutting torch.

6. The combination of claim 3, said battery including a case having a side wall and a bottom, from 2 to 3 of said cells stacked in said case, with the anode of one of said cells in contact with the bottom of said case, and electrical insulation between said cells and said case, and electrical insulation between said cells and said side wall; and in each of said cells, said anode composed of a lithium-aluminum alloy, said cathode composed of iron disulfide, and said electrolyte composed of a lithium chloride-potassium chloride eutectic.

7. The combination of claim 1, said means including an igniter and a relay, said battery being electrically connected to said igniter through said relay, said relay being operable at a predetermined voltage from said battery, to actuate said igniter.

8. In combination, a thermal battery adapted to be activated only by external heating which comprises at least one cell having an anode, a cathode, and an electrolyte positioned between said anode and said cathode, said electrolyte being inactive at ambient temperature but being activated by melting at a predetermined temperature by external heating and
   a means to ignite pyrotechnic or power electronic devices using the electrical output of the battery, said means comprising an igniter and a thermal switch, said battery being electrically connected to said igniter through said switch, said thermal switch being operable at a temperature higher than the temperature of activation of said battery, to actuate said igniter.

9. The combination of claim 8, said battery being mounted in close proximity to ordnance to be protected from fire, and a means associated with said ordnance and triggered by said igniter to protect said ordnance from detrimental heating by said heat source.

10. The combination of claim 9, said ordnance being a rocket motor, said battery being mounted on a rocket motor case, said last mentioned means being a mechanism activated by operation of said igniter to open a hole in said rocket motor case to allow propellant therein to burn off with minimal internal pressure increase and no explosion.

11. The combination of claim 10, said last mentioned means being a rocket motor type of cutting torch.

12. The combination of claim 9, said battery including a case having a side wall and a bottom, from two to three of said cells stacked in said case, with the anode of one of said cells in contact with the bottom of said case, and electrical insulation between said cells and said case, and electrical insulation between said cells and said side wall, and in each of said cells, said anode composed of a lithium-aluminum alloy, said cathode composed of iron disulfide, and said electrolyte composed of a lithium chloride-potassium chloride eutectic.

* * * * *